US011778104B2

(12) United States Patent
Halk et al.

(10) Patent No.: US 11,778,104 B2
(45) Date of Patent: Oct. 3, 2023

(54) SYSTEMS AND METHODS FOR SUGGESTING CONTACTS

(71) Applicant: TEXTNOW, INC., Waterloo (CA)

(72) Inventors: Jonathan Dennis Halk, Waterloo (CA); Derek Ting, Waterloo (CA)

(73) Assignee: TEXTNOW, INC., Waterloo (CA)

( * ) Notice: Subject to any disclaimer, the term of this patent is extended or adjusted under 35 U.S.C. 154(b) by 192 days.

(21) Appl. No.: 17/171,725

(22) Filed: Feb. 9, 2021

(65) Prior Publication Data

US 2021/0168242 A1 Jun. 3, 2021

Related U.S. Application Data

(63) Continuation of application No. 16/808,947, filed on Mar. 4, 2020, now Pat. No. 10,951,773.

(Continued)

(51) Int. Cl.
*H04W 8/26* (2009.01)
*H04M 7/00* (2006.01)
(Continued)

(52) U.S. Cl.
CPC ...... *H04M 7/0075* (2013.01); *H04L 61/4535* (2022.05); *H04L 61/4594* (2022.05); *H04W 8/26* (2013.01); *H04L 2101/65* (2022.05)

(58) Field of Classification Search
CPC ...... G06F 21/602; G06F 1/169; G06F 3/0482; G06Q 30/06; G06Q 10/107; G06Q 50/188;

(Continued)

(56) References Cited

U.S. PATENT DOCUMENTS 6,295,355 B1 * 9/2001 O'Neal ............... H04M 1/56
379/354
7,046,658 B1 5/2006 Kundaje et al.
(Continued)

FOREIGN PATENT DOCUMENTS

CA 2910654 A1 5/2016

OTHER PUBLICATIONS

ISA/CA, International Search Report and Written Opinion, dated Apr. 30, 2020, re PCT International Patent Application No. PCT/IB2020/051889.

(Continued)

*Primary Examiner* — Gerald Gauthier
(74) *Attorney, Agent, or Firm* — Perry + Currier Inc.

(57) ABSTRACT

An example method of suggesting contacts in a communications routing system includes: routing, via a routing engine, communications events between a communications device and a plurality of further communications devices coupled to the communications routing system as VoIP calls using respective VoIP telephone numbers; storing, for a user account associated with the communications device, a contact database representing VoIP telephone numbers stored in a contact tracking application of the communications device; storing, in the contact database for the user account, a log of communications events including a record for each new telephone number; and when the record for a new telephone number satisfies a threshold condition, providing a prompt, at the communications device, to add the new telephone number to the contact tracking application.

18 Claims, 6 Drawing Sheets

Related U.S. Application Data (60) Provisional application No. 62/813,938, filed on Mar. 5, 2019.

(51) Int. Cl.
*H04L 61/4535* (2022.01)
*H04L 61/4594* (2022.01)
*H04L 101/65* (2022.01)

(58) Field of Classification Search
CPC ........ G06Q 30/08; G06Q 50/01; H04L 51/02; H04L 51/212; H04L 61/4535; H04L 61/4594; H04L 63/102; H04L 65/1069; H04L 65/1073; H04L 65/1104; H04L 65/65; H04L 2101/65; H04L 51/043; H04L 51/216; H04L 51/56; H04M 1/2585; H04M 1/27457; H04M 1/2748; H04M 1/2753; H04M 1/2757; H04M 1/56; H04M 1/663; H04M 3/42051; H04M 3/42187; H04M 3/54; H04M 7/0075; H04M 2250/60; H04M 1/2746; H04M 1/72436; H04M 3/487; H04W 4/024; H04W 8/26; H04W 4/16; H04W 76/14; G16H 50/20

See application file for complete search history.

(56) References Cited

U.S. PATENT DOCUMENTS

| | | | |
|---|---|---|---|
| 7,839,987 B1* | 11/2010 | Kirchhoff | H04M 3/54 379/142.01 |
| 8,509,226 B1 | 8/2013 | Murphy et al. | |
| 9,467,542 B1* | 10/2016 | Messenger | H04M 3/42051 |
| 9,621,735 B2 | 4/2017 | Ting et al. | |
| 10,182,034 B1 | 1/2019 | Koster | |
| 10,194,010 B1* | 1/2019 | Donohue | H04L 51/212 |
| 10,432,786 B1 | 10/2019 | Ting et al. | |
| 10,645,209 B1* | 5/2020 | Lau | H04W 4/024 |
| 10,951,773 B2* | 3/2021 | Halk | H04M 7/0075 |
| 2002/0087534 A1* | 7/2002 | Blackman | G06Q 50/188 |
| 2004/0179672 A1 | 9/2004 | Pagel et al. | |
| 2005/0091314 A1 | 4/2005 | Blagsvedt et al. | |
| 2006/0046768 A1* | 3/2006 | Kirbas | H04M 1/2757 455/550.1 |
| 2006/0084410 A1 | 4/2006 | Sutaria et al. | |
| 2006/0205432 A1 | 9/2006 | Hawkins et al. | |
| 2007/0115940 A1 | 5/2007 | Kamen et al. | |
| 2007/0147234 A1 | 6/2007 | Walter et al. | |
| 2007/0183406 A1 | 8/2007 | Bennett | |
| 2007/0217589 A1 | 9/2007 | Martin et al. | |
| 2007/0266156 A1 | 11/2007 | Wilkins | |
| 2007/0269038 A1* | 11/2007 | Gonen | G06Q 30/08 379/265.02 |
| 2008/0059627 A1* | 3/2008 | Hamalainen | H04M 1/663 709/227 |
| 2008/0133580 A1* | 6/2008 | Wanless | H04L 61/4594 707/999.102 |
| 2008/0242361 A1* | 10/2008 | Onda | H04M 1/2748 455/566 |
| 2009/0300546 A1* | 12/2009 | Kwok | G06Q 10/107 715/825 |
| 2010/0066677 A1* | 3/2010 | Garrett | G06F 1/169 345/173 |
| 2010/0145754 A1 | 6/2010 | Rahman | |
| 2010/0261486 A1* | 10/2010 | Sheha | H04M 1/2746 455/457 |
| 2010/0296425 A1 | 11/2010 | Arsenault et al. | |
| 2011/0034156 A1* | 2/2011 | Gatti | H04M 1/56 455/418 |
| 2011/0087747 A1* | 4/2011 | Hirst | H04M 1/72436 707/E17.014 |
| 2011/0159854 A1* | 6/2011 | Kedefors | H04L 51/216 455/414.1 |
| 2012/0046054 A1* | 2/2012 | Celik | H04M 1/2757 455/466 |
| 2013/0067039 A1* | 3/2013 | Hartzler | H04L 61/4594 709/219 |
| 2013/0157626 A1 | 6/2013 | Talwar et al. | |
| 2014/0074596 A1 | 3/2014 | Kolluri et al. | |
| 2014/0133642 A1* | 5/2014 | Lundsgaard | G06Q 30/06 379/201.02 |
| 2014/0189019 A1* | 7/2014 | Hudack | H04L 61/4594 709/206 |
| 2014/0211700 A1 | 7/2014 | Anson et al. | |
| 2014/0254574 A1 | 9/2014 | Schreuder | |
| 2015/0143255 A1* | 5/2015 | Agrawal | H04L 51/02 715/752 |
| 2015/0156327 A1* | 6/2015 | Van Buren | H04W 4/16 370/352 |
| 2015/0242501 A1* | 8/2015 | Guild | G06Q 50/01 715/733 |
| 2015/0356583 A1 | 12/2015 | Sheppard et al. | |
| 2015/0373193 A1* | 12/2015 | Cook | H04M 1/663 455/406 |
| 2015/0381820 A1* | 12/2015 | Ting | H04L 65/1069 370/259 |
| 2016/0088162 A1* | 3/2016 | Carlos | H04M 3/42187 370/259 |
| 2017/0052661 A1* | 2/2017 | Thelin | H04L 63/102 |
| 2017/0104874 A1 | 4/2017 | Yi et al. | |
| 2017/0155604 A1* | 6/2017 | Wang | H04L 51/56 |
| 2017/0228584 A1* | 8/2017 | Studnicka | H04W 76/14 |
| 2018/0005645 A1* | 1/2018 | Khaleghi | G16H 50/20 |
| 2018/0060017 A1* | 3/2018 | Lauck | H04M 1/2757 |
| 2019/0306674 A1 | 10/2019 | Ting | |
| 2019/0340385 A1* | 11/2019 | Alsina | G06F 21/602 |
| 2019/0364013 A1* | 11/2019 | Kamdar | G06Q 30/06 |
| 2020/0133443 A1* | 4/2020 | Lagares-Greenblatt | G06F 3/0482 |
| 2020/0288020 A1* | 9/2020 | Halk | H04L 65/1073 |
| 2021/0168242 A1* | 6/2021 | Halk | H04M 1/2753 |

OTHER PUBLICATIONS

VOIP\STUDIO, "What is VoIP and How does a VoIP phone number work?", voipstudio.com, Sep. 23, 2015. Retrieved from the Internet on Jan. 19, 2016. URL: <https://voipstudio.com/blog/what-is-a-voip-phone-number/>.

* cited by examiner

SYSTEMS AND METHODS FOR SUGGESTING CONTACTS

FIELD

The specification relates generally to electronic communications, and more particularly to systems and methods for suggesting contacts.

BACKGROUND

Telephony applications, including Text and SMS, are commonly installed on communications devices, including mobile devices and fixed (hard-wired desktop) computers. An address book, contacts database, or other suitable contact tracking application may typically be included on these communications devices as an integrated telephony application or a separate application.

Currently, after sending or receiving a telephone or text message with a new telephone number (wherein "new" may be defined as not being stored in the contact tracking application), telephone applications may prompt the user to add the new telephone number to the contact tracking application. This may be ineffective, cumbersome, and frustrating for users as users frequently may not want to add telephone numbers to their contacts. For example, many new telephone numbers may relate to one-time use telephone calls such as those from spam centers or to a restaurant or other seldom-used service.

SUMMARY

According to an aspect of the present specification, an electronic communications system is provided. The electronic communications system is coupled to a mobile network, a wireless local-area network (WLAN), and a voice over IP (VoIP) service. The electronic communications system includes: a communications device associated with a user account and a VoIP telephone number for making VoIP calls using the VoIP service, wherein the communications device has a contact tracking application and is coupled to the VoIP service and at least one of the mobile network and the WLAN; and a communications routing system coupled to the communications device, the communications routing system configured to: route, via a routing engine, communications events between the communications device and a plurality of further communications devices coupled to the communications routing system as VoIP calls using respective VoIP telephone numbers; store, for the user account, a contact database representing VoIP telephone numbers stored in the contact tracking application of the communications device associated with the user account; store, in the contact database for the user account, a log of communications events including a record for each new telephone number; and when the record for a new telephone number satisfies a threshold condition, provide a prompt, at the communications device, to add the new telephone number to the contact tracking application.

According to another aspect, the threshold condition comprises one or more of: a number of communications events with the new telephone number exceeding a threshold frequency; the communications events with the new telephone number satisfying a predefined distribution of communications events; and an attribute of one of the communications events satisfying a corresponding attribute condition.

According to another aspect, the record comprises data fields for individual communications event with the new telephone number and data fields to store aggregate data for each type of communications event.

According to another aspect, the communications routing system is configured to determine whether a voice call exceeds a predetermined duration; and in response to the voice call exceeding the predetermined duration, add the voice call to the log of communications events.

According to another aspect, the record is stored for a predetermined period of time on a rolling basis, wherein data received prior to the predetermined period of time is deleted.

According to another aspect, the prompt comprises a telephone number field, an add command, and a skip command, wherein the add command and the skip command are selectable to send a response to the communications routing system.

According to another aspect, the prompt further comprises one or more of a name field, and an address field.

According to another aspect, the communications routing system prepopulates the name field with a name extracted from one of (i) a caller ID service or (ii) an internet search of the new telephone number.

According to another aspect, in response to a negative response to the prompt, the communications routing system is configured to store a current date as a last suggested date in association with the new telephone number.

According to another aspect, prior to providing the prompt, the communications routing system is to obtain the last suggested date and provide the prompt only when the last suggested date is outside a predetermined minimum suggestion cool down period.

According to another aspect, in response to an affirmative response to the prompt, the communications routing system is configured to: obtain contact information associated with the new telephone number; and store the new telephone number and associated contact information in the contact database.

According to another aspect, in response to the affirmative response to the prompt, the communications routing system is further configured to delete the record associated with the new telephone number from the log of communications events.

According to another aspect of the present specification, a method in a communications routing system is provided. The method includes: routing, via a routing engine, communications events between a communications device and a plurality of further communications devices coupled to the communications routing system as VoIP calls using respective VoIP telephone numbers; storing, for a user account associated with the communications device, a contact database representing VoIP telephone numbers stored in a contact tracking application of the communications device; storing, in the contact database for the user account, a log of communications events including a record for each new telephone number; and when the record for a new telephone number satisfies a threshold condition, providing a prompt, at the communications device, to add the new telephone number to the contact tracking application.

According to another aspect, the method further includes: in response to a negative response to the prompt, storing a current date as a last suggested date in association with the new telephone number.

According to another aspect, the method further includes: prior to providing the prompt, obtaining the last suggested date and providing the prompt only when the last suggested date is outside a predetermined minimum suggestion cool down period.

According to another aspect, the method further includes: in response to an affirmative response to the prompt: obtaining contact information associated with the new telephone number; and storing the new telephone number and associated contact information in the contact database.

According to another aspect, the method further includes: in response to the affirmative response to the prompt, the method further comprises deleting the record associated with the new telephone number from the log of communications events.

BRIEF DESCRIPTION OF DRAWINGS

Implementations are described with reference to the following figures, in which.

DETAILED DESCRIPTION

The present specification generally relates to an electronic communications system for providing electronic communications services (e.g., voice telephone calls, short message service or SMS messages, text-image-video-audio messages, general data communications, etc.) with address books. The system, for example, includes a quality of service and having VoIP telephone numbers where each VoIP telephone number is associated with one or more communications devices. While certain infrastructure may not operate under Internet Protocol (IP) (e.g., PSTNs, cellular base station networks, etc.), communications are routed to and from such infrastructure using IP to the extent possible. The present specification also generally relates to systems and methods for improving contact management services provided to communications devices. Specifically, the present system provides improved suggestions for adding new contact information by inferring users' desires based on their interactions with new telephone numbers. Other aspects of the present specification will also be come apparent in light of the following detailed description.

Figure 1:
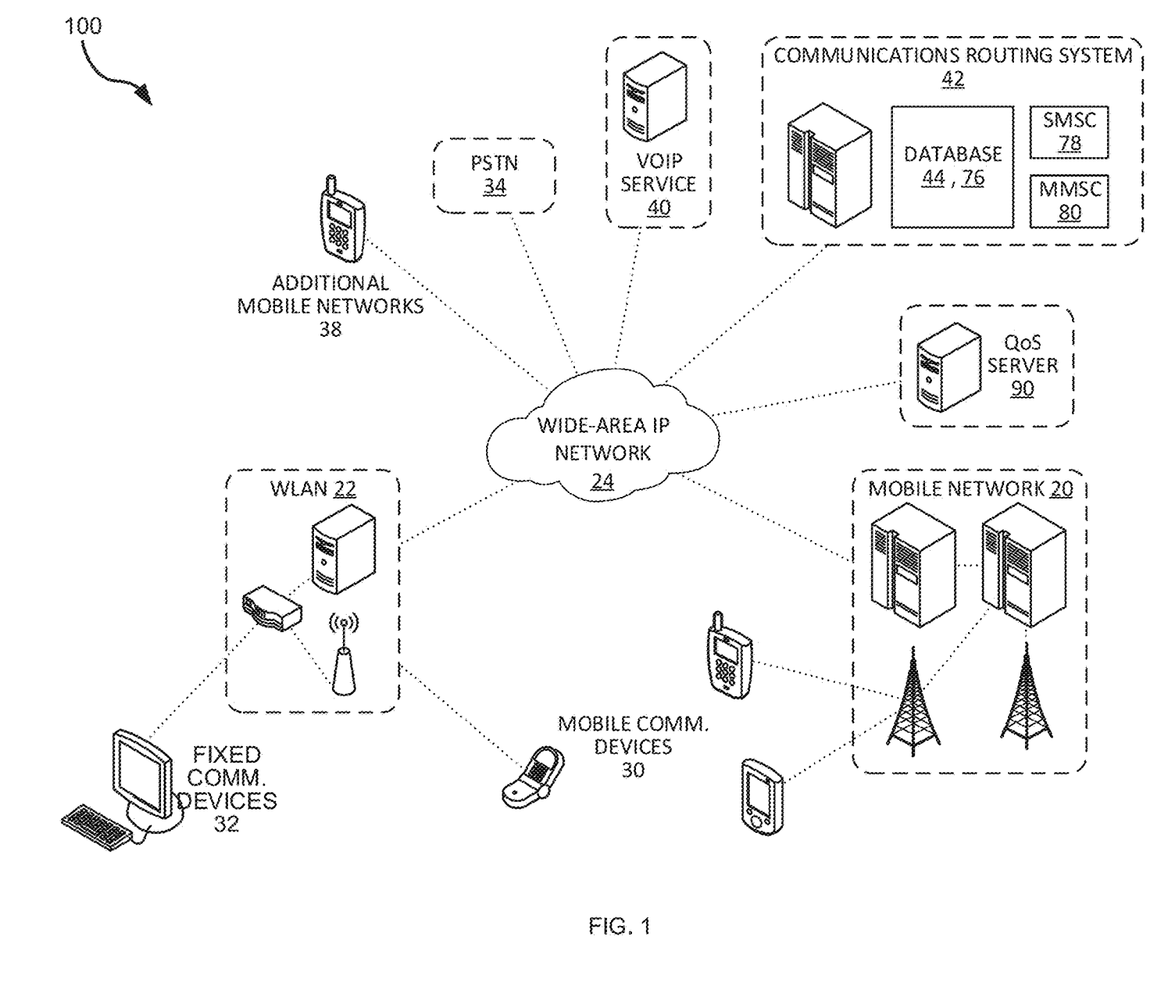
FIG. 1 is a block diagram of an example communications system which provides improved contact suggestions.

FIG. 1 depicts a block diagram of a communications system 100 which provides communications services and improved contact suggestions in accordance with an exemplary embodiment of the present specification. The communications system 100 comprises a communications routing system 42 with a contacts database 86. As is known in the art, the contacts database 86 may alternatively reside in another component of the communications system 100 or in a separate server.

The system 100 includes a mobile network (MN) 20, such as a wireless cellular network that operates under one or more known standards and technologies, such as Long Term Evolution (LTE), Worldwide Interoperability for Microwave Access (WiMAX), Enhanced Voice-Data Optimized (EVDO), Code Division Multiple Access (CDMA), HSPA (High Speed Packet Access), and similar. The mobile network 20 provides voice, data, and SMS services.

The system 100 further includes at least one wireless local-area network (WLAN) 22 that operates under one or more known standards and technologies, such as IEEE 802.11 For simplicity of illustration, WLAN 22 also includes a local-area network using landlines (wired access points).

The mobile network 20 and the WLAN 22 each connect to a wide-area IP network 24, such as the Internet. The WLAN 22 can be connected to the wide-area IP network 24 by an Internet service provider (ISP) or the similar entity (not shown). The mobile network 20 can be connected to the wide-area IP network 24 by a packet data interface.

The system 100 can further include a push notification service (not shown), such as the kind operated by Google Inc. of Mountain View, Calif., and Apple Inc. of Cupertino, Calif.

A plurality of mobile communications devices 30 can connect to the mobile network 20, via base stations and other infrastructure, and can further connect to the WLAN 22, via access points or similar. Examples of suitable mobile communications devices 30 include devices such as cellular telephones, smartphones, tablet computers, and the like that are provided with wireless communications interfaces suitable for the particular technologies used in the mobile network 20 and the WLAN 22. For sake of discussion it is assumed that all of the mobile communications devices 30 can connect to the mobile network 20 and WLAN 22. In various implementations, different mobile communications devices have different types of wireless communications interfaces, different configurations, and/or different access rights suitable for connection to different mobile networks and different WLANs.

One or more other communications devices 32, such as a desktop computer, laptop or wi-fi only device, server, or similar, can also connect to the WLAN 22, via a router or wired access point. For clarity, the term communications devices 30, 32 means mobile communications devices 30 and other communications devices 32.

Each of the communications devices 30, 32 comprise a client program and an address book application. The client program is a software application to operate the communications devices 30, 32 in coupling to the rest of the communications system 100, and further includes functionality to obtain and display advertisements to users. The advertisements may pay for the communications services provided by the communications devices 30, 32 in whole or in part.

The contact tracking application may be part of the client program in some embodiments. The contact tracking application comprises contact information with, for example, names, addresses, email addresses, and telephone numbers.

The system 100 can further be connected to a public switched telephone networks (PSTN) 34 that supports connecting to a plurality of landline telephones, and additional mobile networks 38. The additional mobile networks 38 may have the same or similar features of the mobile network 20 and may be operated by different carriers and/or operated according to different technologies and standards when compared to the mobile network 20. For clarity, the mobile communications devices 30 connected to the mobile network 20 may also initiate to or receive voice calls directly from the PSTN 34 (which may include additional mobile networks 38) via the mobile network 20. Further, such voice calls, for example, may be via GSM (Global System for Mobile communications) from the mobile network 20. For convenience, such voice calls via the mobile network 20 in this disclosure are referred to as via a "voice channel". This is in contrast to VoIP voice calls using a "data channel" of the mobile network 20 such as the Packet Data Channel of GPRS (General Packet Radio Service).

The system 100 further includes at least one voice-over-IP (VoIP) service 40, which can be configured to manage IP data streams related to VoIP communications (for example routing the IP data stream from communications device 30, 32 to another communications device 30, 32). All VoIP calls are streamed through the VoIP service 40. It also interfaces (transcoding as necessary) with the PSTN 34 and the additional mobile networks 38.

The VoIP service 40 may operate using one or more protocols, such as the Session Initiation Protocol (SIP), and one or more audio codecs, such as Opus. The VoIP service 40 can be connected to the PSTN 34 to allow VoIP calls to be place to and from landlines and wireless devices in the additional mobile networks 38. One of the functions of the VoIP service 40 is to transcode the IP data streams so that it is compatible between different networks (for example between the mobile network 20 and the PSTN 34). In some implementations, the VoIP service 40 is a subcomponent of the mobile network 20 or the additional mobile networks 38.

The system 100 further includes a communications routing system 42 connected to the VoIP service 40, the push notification service (not shown for simplicity), and the mobile network 20 via the wide-area IP network 24. In some implementations, the VoIP service 40 is directly connected to the communications routing system 42 via a local IP network distinct from the wide-area IP network 24. The communications routing system 42 is configured to direct the routing of communications of disparate types between mobile communications devices 30 via the mobile network 20 and/or the WLAN 22, and further with communications devices (including landlines) of the PSTN 34 and the additional mobile networks 38 as needed.

The system 100 can further include a proxy (not shown for simplicity) connected to the communications routing system 42, the WLAN 22, and the mobile network 20 via the wide-area IP network 24. In some implementations, the communications routing system 42 and the mobile communications devices 30 can be configured to route communications events through the proxy. The proxy can be configured to handle VoIP call handoffs, as an alternative to the communications routing system 42 handling such, In addition, the proxy can be configured to prioritize communications events associated with the enhanced 911 system, as an alternative to the communications routing system 42 doing so. For example, the proxy can control quality of service (QoS) settings for various communications, so that 911 calls are prioritized. In some implementations, the VoIP service 40 is configured to route all relevant VoIP data through the proxy. A suitable proxy service can be in the form of that available from Pravala Networks Inc., of Kitchener, Ontario. Canada.

The system 100 can further include an interoperation service (64, FIG. 2) connecting the communications routing system 42 to the mobile network 20 via the wide-area IP network 24. The communications routing system 42 can be connected to the interoperation service via a virtual private network (VPN) established over the wide-area IP network 24. The interoperation service is configured to interface with the various mobile networks 20, 38. The interoperation service facilitates data communications between the communications routing system 42 and the mobile network 20. The interoperation service further facilitates messaging services, such as SMS and MMS, between the communications routing system 42 and the additional mobile networks 38. The interoperation service can be the kind provided by Syniverse of Tampa, Florida.

The communications routing system 42 (FIG. 2) includes at least one database, such as an accounts database 44 and one or more user data databases 76, configured to store user account data. For example, the user data databases 76 may store associations between account identifiers (user accounts) and device identifiers including mobile-network identifiers supported by the mobile network 20, such as mobile directory numbers (MDNs, or telephone numbers) of the mobile communications devices 30, and fixed identifiers of the other communications devices 32, That is, for each user account, the database 44, 76 can store associations with a number of communications devices 30, 32. For example, a user may have one user account which is associated with one or more other communications devices 32 and/or one or more mobile communications devices 30. For some embodiments, a mobile device, such as a laptop or tablet, with only WLAN 22 capabilities can be treated as other communications devices 32.

Figure 2:
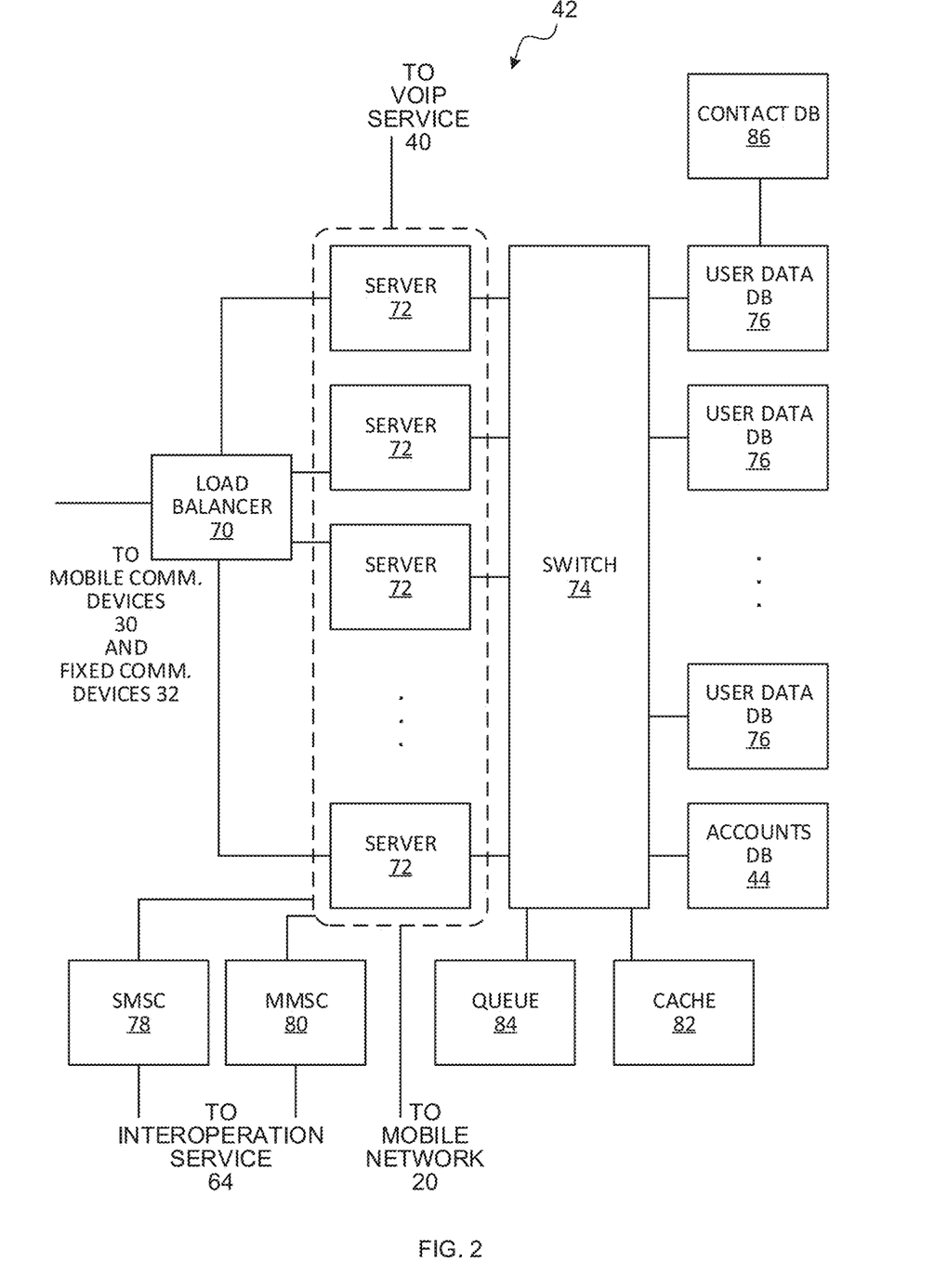
FIG. 2 is a block diagram of a communications routing system in the communications system of FIG. 1.

The communications routing system 42 further stores a contacts database 86 for each user account. The contacts database 86 is thus shown in association with the user data database 76. The contacts database 86 for a given user account comprises stored contact information for each user account and a history queue for each user account. A telephone number may be referred to as "stored" when the telephone number is stored in association with other identifying information (e.g., a name, address, or the like) in the contact information of the contacts database, A telephone number may be referred to as "new" when the telephone number is not stored in association with other identifying information in the contact information of the contacts database. The history queue of a user account is a log of communications events relating to new telephone numbers. For example, the log of communications events may include inbound telephone voice calls, outbound telephone voice calls, inbound text messages, outbound text messages and the like. The contact information in the contacts database 86 is synchronized with the contact tracking applications of the communications devices 30, 32 of each user account.

One mobile communications device 30 can have a first MDN for SMS/MMS messages and VoIP calls, and a second MDN for services on the mobile network 20. The first and second MDNs are distinct and mutually different. The first MDN is used at the VoIP service 40 and the communications routing system 42 for VoIP calls. The first MDN is also used at the interoperation service and communications routing system 42 for communicating SMS/MMS messages. In some implementations, the first MDNs are landline telephone numbers obtained from at least one competitive local exchange carrier (CLEC). The second MDN is used by the mobile network 20 to track data usage by each respective mobile communications device 30, with the communications routing system 42 using the second MDNs to map data usage to particular user accounts. The database 44, 76 may further store push tokens to identify mobile communications devices 30 via the push notification service, so that the communications routing system 42 can send push notifications to the mobile communications devices 30. Alternatively or additionally, the database 44, 76 may store currently assigned IP addresses for the communications devices 30, 32.

In some embodiments, only the first (VoIP) MDN is used and the first MDN is registered with the mobile network 20 for data usage at the mobile network 20. For such embodiments, functionality described herein described with respect to the second (mobile network) MDN is performed using the first (VoIP) MDN.

In other embodiments, a VoIP telephone number is associated with each user name which is distinct from the MDNs of the one or more mobile communications devices 30 of the user. The IP addresses of the communications devices 30, 32 may be obtained when the communications devices 30, 32 contacts the communications routing system 42.

The communications routing system 42 further includes a routing engine responsive to incoming communications events. Incoming communications events can include initiation of voice calls, ending of voice calls, communications of SMS/MMS messages, requests for data. The routing engine is further configured to route data communications with the plurality of mobile communications devices 30 over the mobile network 20 and the WLAN 22 using the Internet, as well as with the plurality of other communications devices 32 over the WLAN 22 using the Internet. The routing engine is further configured to initiate and end voice calls with communications devices 30, 32 as VoIP calls using the VoIP server 40, and to communicate SMS messages with the plurality of mobile communications devices 30 via the mobile network 20 and the WLAN 22 using the Internet, as well as with the plurality of other communications devices 32 over the WLAN 22 using the Internet.

The communications routing system 42 can further include a short message service center (SMSC) 78 and a multimedia message service center (MMSC) 80 configured to store, forward, convert and deliver SMS and MMS messages between the communications routing system 42 and the interoperation service (64, FIG. 2). The SMSC 78 and MMSC 80 can be configured to communicate with the interoperation service using the Short Message Peer-to-Peer (SMPP) protocol.

Each mobile communications device 30 and other communications device 32 can be associated with one of the unique account identifiers (also known as user accounts) stored in the database 44, 76. This can be achieved by, for example, a client program executed on the mobile communications device 30 requiring a user log in (not shown). When a user is logged in to the client program, for example, the mobile communications device 30 becomes associated with the respective unique account identifier. One user account may be associated with more than one communications devices 30, 32.

For each account identifier in the database 44, 76; there is associated a voice call log, voice mails, SMS/MMS messages, contacts, and other such account data. For clarity, the contacts (or contact information) is stored in a contact database 86 (see FIG. 2). The contact information is also stored in contact tracking applications of associated communications devices 30, 32. Such account data is synchronized with all of the communications devices 30, 32 associated with each account identifier so that a user may review the same account data between different communications devices 30, 32 of the user.

Each account identifier can be associated with a plurality of mobile communications devices 30, and each of the mobile communications devices 30 can be associated with a first mobile-network identifier, such as a first MDN that is associated with the VoIP service 40. Each account identifier can be associated with a second mobile-network identifier, such as a second MDN that is associated with mobile data access on the mobile network 20. In some implementations, the second MDN is only associated with mobile data access on the mobile network 20 to the exclusion of access to circuit-switched voice services and SMS/MMS services that may be available on the mobile network 20. The mobile network 20 uses the second MDN to track data usage of the mobile communications device 30, which can be reported to the communications routing system 42. Hence, for each account identifier, voice services via the VoIP server 40 are conducted with one MDN and data services are conducted via the mobile network using a different MDN. The communications routing system 42 maps each MDN to a particular account for managing overall services to that account identifier.

An outgoing voice call from a communications device 30, 32 is conducted as follows. The communications device 30, 32 sends a call request to the VoIP service 40 via the WLAN 22, if connected, or otherwise via the mobile network 20. The communications device 30, 32 registers with the VoIP service 40 if not already registered. If the destination device is on the PSTN 34, the VoIP service 40 completes the call via the PSTN 34. If the destination device has an account with the communications routing system 42, then the VoIP service 40 notifies the communications routing system 42 of the call request. The communications routing system 42 then issues a push notification to the destination device (if connected via mobile network 20, through the push notification service) to notify the destination device of the call. Then the destination device registers with the VoIP service 40, if not already registered, and notifies the VoIP service 40 of call acceptance. The VoIP service 40 can notify the communications routing system 42 of call initiation and ending. When the proxy is used, VoIP voice data is routed through the proxy. The outgoing voice call event is recorded in the associated account data of the account identifier in the communications routing system 42 so that it may be synchronized with the client programs (applications) on the other communications devices 30, 32 of the account identifier.

The mobile communications devices 30 can perform SIP registrations in a variety of ways.

For mobile communications devices 30 operating on iOS by Apple Inc., the mobile communications device 30 receiving a push notification does not immediately trigger SIP registration. Rather, the push notification informs the user of the incoming call, via an alert or similar. The user can then respond to the push notification by opening the client program, which then performs the SIP registration.

For mobile communications devices 30 operating on Android by Google Inc., the mobile communications device 30 can be configured to perform a SIP registration in response to receiving a push notification for an incoming call, That is, the SIP registration process can be started before the user has accepted the call.

For some embodiments, incoming voice calls to a VoIP telephone number of the communications devices 30, 32 arrive at the VoIP service 40 via the PSTN 34 (for example). Incoming voice calls may also arrive at the VoIP service 40 via the mobile network 20 or the WLAN 22. The VoIP service 40 notifies the communications routing system 42 of a call request for a particular destination communications device 30, 32. The communications routing system 42 then issues a push notification to all of the destination communications devices 30, 32 (through the push notification service where connected to the mobile network 20), associated with the VoIP telephone numbers, to notify the destination communications devices 30, 32 of the call.

If the user of the destination communications devices 30, 32 accepts the call on one of the destination communications devices 30, 32, then the destination communications device 30, 32 registers with the VoIP service 40, if not already registered, and notifies the VoIP service 40 of call acceptance. The VoIP service 40 notifies the communications routing system 42 of call initiation and ending.

Incoming and outgoing voice calls made to or from a communications device 30, 32 associated with the communications routing system 42 are made using the VoIP telephone number, which is established at the VoIP service 40. When such a call is conducted as data via the mobile network 20, the second MDN of the relevant mobile communications device 30 is used to track the data usage on the mobile network 20.

In some embodiments, caller ID is based on the VoIP telephone number to the exclusion of the mobile network MDN. That is, the mobile network MDN is for tracking data usage only, and the VoIP telephone number is the basis for outgoing and incoming calls.

An outgoing SMS/MMS message can be sent by a communications device 30, 32 as follows. One or more IP data packets containing the SMS/MMS message are sent from the communications device 30, 32 to the communications routing system 42 via the WLAN 22, if connected, or otherwise via the mobile network 20. The sent data specifies a destination device using an MDN. The communications routing system 42 determines whether the MDN is stored in the database 44, 76 and thus whether the destination device is a communications device 30, 32 associated with the communications routing system 42. If the destination device is a communications device 30, 32 associated with the communications routing system 42, then the communications routing system 42 stores the message and sends a push notification to the destination communications device 30, 32 via the push notification service (if connected via the mobile network 20). When a user at the destination communications device 30, 32 opens an SMS/MMS application/module or performs a similar action, the destination communications device 30, 32 fetches the stored message from the communications routing system 42. If the destination device is not associated with the communications routing system 42, then the communications routing system 42 sends the SMS/MMS message to the destination device via the interoperation service.

Incoming SMS/MMS messages for the communications devices 30, 32 arrive at the communications routing system 42 either directly from other communications devices 30, 32 that have accounts at the communications routing system 42 or via the interoperation service for devices that are not associated with the communications routing system 42, The communications routing system 42 stores a particular SMS/MMS message and sends a push notification to the destination communications device 30, 32. When a user at the destination communications device 30, 32 opens an SMS/MMS application/module or performs a similar action, the destination communications device 30, 32 fetches the stored message from the communications routing system 42.

Incoming and outgoing SMS/MMS messages made to or from a mobile communications device 30 associated with the communications routing system 42 are made using the first MDN. When messages are sent as data through the mobile network 20, the second MDN of the respective mobile communications device 30 is used to track the data usage on the mobile network 20.

Incoming and outgoing SMS/MMS messages are recorded in the associated account data of the account identifier in the communications routing system 42 so that it may be synchronized with the client programs on the other communications devices 30, 32 of the account identifier. In some embodiments, this synchronization occurs as and when the user of the other communications devices 30, 32 accesses the associated client programs when the client programs contacts the communications routing system 42 to synchronize with the incoming and outgoing SMS/MMS messages, the voice call logs, the voice mails, and other such services including an address book of contacts.

Data communications between communications devices 30, 32 and between communications devices 30, 32 and data sources, such as web sites connected to the wide-area IP network 24, are performed via the WLAN 22, if connected, and otherwise via the mobile network 20.

The system 100 further comprises a quality of services (QoS) server 90. The QoS server 90 determines the performance of a data channel to a communications device 30, 32 for a voice call. Where the performance of the data channel to a communications device 30, 32 degrades or drops, the QoS server 90 directs the communications routing system 42 to establish a new channel to the communications device 30, 32 to continue the voice call. In the event that all data channels are degraded or terminated, then the QoS server 90 directs the communications routing system 42 to continue the voice call via a voice channel over the PSTN 34 (or mobile network 20) when the mobile communications device 30 is connected to the mobile network 20.

The QoS server 90 is shown as a standalone component in FIG. 1 however, it may be a subcomponent of another component such as the VoIP Service 40 and the communications routing system 42. The QoS server 90 is connected to the wide-area IP network 24 and as such a connection can be made with any of the communications devices 30, 32.

For further clarity, it will be understood that the mobile communications devices 30 may be simultaneously connected to both the mobile network 20 and the WLAN 22. While mobile network 20 may generally provide a better performing data channel then the WLAN 22 for voice calls, the WLAN 22 may provide the data channel free of charge to users.

FIG. 2 shows a diagram of the communications routing system 42 according to FIG. 1. The communications routing system 42 which includes a load balancer 70, a plurality of servers 72, a switch 74, a plurality of user data databases 76 which includes a contact database 86, and the accounts database 44. The load balancer 70, servers 72, and switch 74 can be considered a routing engine. However, this is not limiting.

Communications devices 30, 32 connect to the load balancer 70 via the wide-area IP network 24 using a protocol, such as HTTP, HTTPS, or the like. The load balancer 70 is configured to balance requests from the communications devices 30, 32 among the servers 72.

The servers 72 are connected to the load balancer 70. The servers 72 can be configured to interface with the VoIP service 40 and the mobile network 20. The servers 72 can be clones having the same functionality. The servers 72 contain program code configured to interface with application programming interfaces (APIs) provided by the VoIP service 40 and the mobile network 20 and/or provide APIs for use by the VoIP service 40 and the mobile network 20. The servers 72 can be implemented using Nginx, PHP, and similar technology.

The SMSC 78 and the MMSC 80 are connected to the servers 72 and configured to store, forward, convert and deliver SMS and MMS messages between the servers 72 and the interoperation service using, for example, the SMPP protocol and the MM4 protocol. The SMSC 78 and MMSC 80 can be configured to connect to the interoperation service via a suitable binding and through a VPN tunnel. The SMSC 78 and MMSC 80 expose an API to the routing engine, such that the routing engine can use the API to send outgoing SMS/MMS messages. For incoming messages, the SMSC 78 and MMSC 80 are configured to invoke an API of the routing engine to cause the routing engine to store a received message and send a notification of the message to the destination communications device 30, 32.

The switch 74 connects the servers 72 to the user data databases 76, the accounts database 44, a cache 82, a queue 84, and the contact database 86. Alternatively, the contact database 86 is a separate database apart from the user data database 76. It is a matter of convenience whether each user's data is part of the user data database 76 or the contact database 86 is a separate database. For illustration, the contact database 86 is shown as part of the user data databases 76.

The user data databases 76 store data for each of the users identified in the accounts database 44. Such user data can include the mobile network MDNs session ID, password, residential address, contacts (e.g. address book of contacts), sessions, in-app purchases, subscriptions, settings, balance information, and communications events including call histories, voice mail content, SMS/MMS message transmission histories, and SMS/MMS message content. The user data databases 76 can be configured to store communications event histories for all user names in the accounts database 44, such that a particular user's history can be downloaded to any communications device 30, 32 with which the user logs in. The user data databases 76 can be implemented as database shards.

The contact database 86 comprises the contact information (e.g., names, addresses, telephone numbers) for each user account and the log of communications events. A communications event is an interaction that a communications device associated with a user account has with another communications device associated with another telephone number. Telephone numbers which are not stored in the contact information may be referred to as new telephone numbers. Specifically, the log of communications events may store a record for each new telephone number. When the record associated with a given new telephone number satisfies a threshold condition, the user may be prompted to add the telephone number to theft contacts (i.e., to store the telephone number in association with other identifying information in the contact information of the contact database 86). The contact information is synchronized with the information stored in contact tracking applications of communications devices 30, 32.

The user data is stored by the communications routing system 42 so that it may be synchronized with the client programs on the communications devices 30, 32 of the account identifiers (e.g. user accounts). In some embodiments, this user data synchronization occurs as and when the user accesses the client programs on the of the communications devices 30, 32 of the user.

In addition, for some embodiments, the routing engine is configured to answer incoming calls with a busy signal when one of the communications devices 30, 32 of associated with the VoIP telephone number is in another call. In other embodiments, the routing engine is configured to instead ring (notification including by audio and/or vibration) the communications devices 30, 32 with the communications device 30, 32 is in another call providing an indication (by audio or vibration).

The cache 82 can be checked for data prior to requesting data from the user data databases 76. In addition, requests can be queued in the queue 84, which can be implemented using Redis or similar technology.

The accounts database 44 stores accounting data (such as data usage) of the users (or user accounts) and may include the identity of the users, account identifiers (user names), and associated VoIP telephone numbers.

Figure 3:
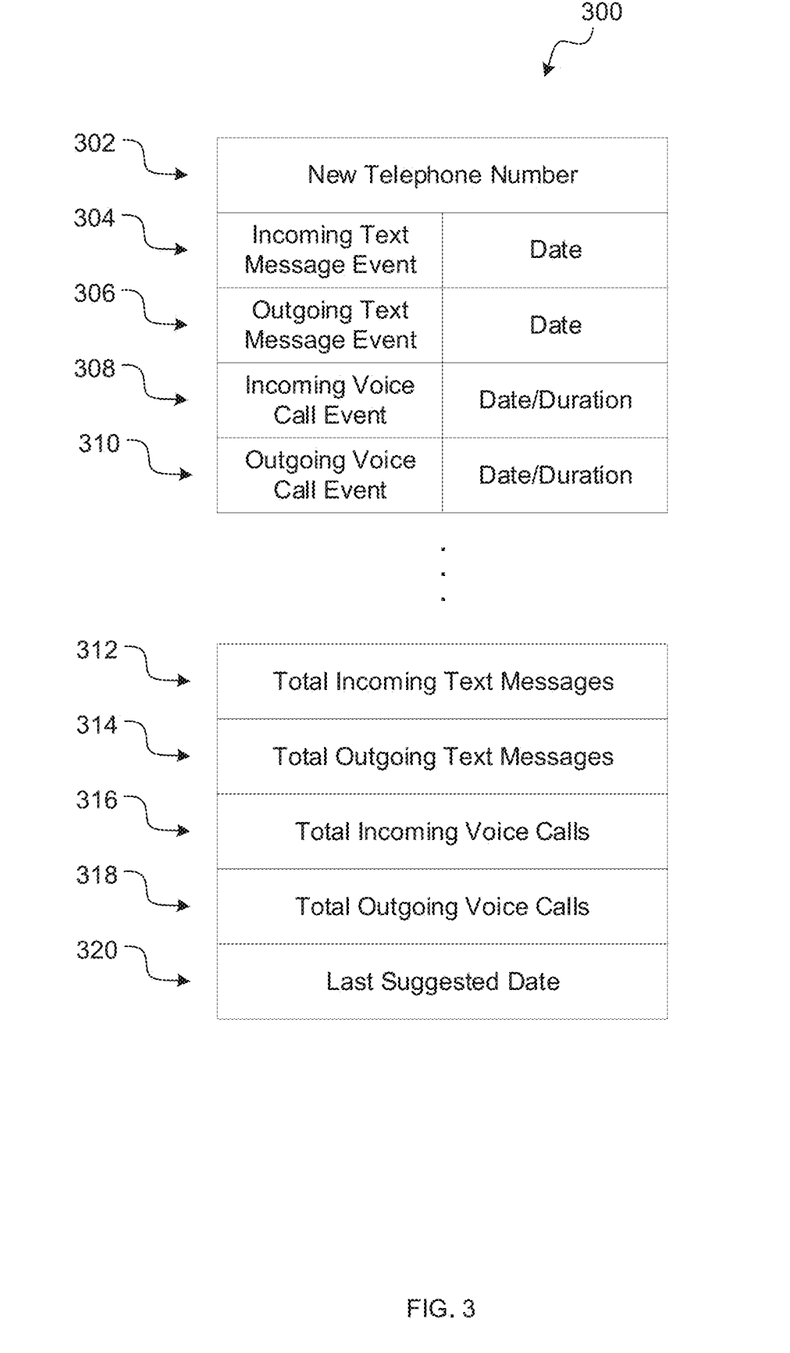
FIG. 3 is a schematic of an example record for a new telephone number in the communications system of FIG. 1.

FIG. 3 shows an example record 300 of the contact database 86 of the communications routing system 42. The contact database 86 includes a log of communications events with new telephone numbers. Specifically, the log includes a record 300 for each new telephone number of an associated user account. The record 300 includes a data field to identify the new telephone number 302, and data fields for individual communications event with the new telephone number. Specifically, the record 300 includes data fields for inbound text messages 304, outbound text messages 306, inbound voice calls 308, outbound voice calls 310 and other relevant communications events. The data stored in the record 300 may include dates of the inbound and outbound text messages, dates and durations of the inbound and outbound voice calls, and the like. For certainty, the inbound text messages 304 and the outbound text messages 306 may include any of text, pictures, images, and video. Thus, each line of data 304, 306, 308, and 310 represents an individual communications event with the new telephone number. For each communications event with the new telephone number, a corresponding new line of data 304, 306, 308, or 310 is added to the record 300.

In some examples, the inbound and outbound voice calls data fields 308, 310 may track the duration of any inbound and outbound voice calls. In other examples, the inbound and outbound voice calls data fields 308, 310 may only track the dates of voice calls having at least a predetermined duration. That is, voice calls may only be stored in the record 300 if the duration of the voice call is above a predetermined time. Specifically, the communications routing system 42 may determine whether the voice call exceeds the predetermined duration. In response to an affirmative determination, the communications routing system 42 may add the voice call to the record 300. This predetermined duration may optionally be set by the user of the user account, and may be different for inbound and outbound voice calls.

The record 300 may also include data fields to store aggregate data for each type of communications event, such as a total number of inbound texts 312, a total number of outbound texts 314, a total number (and/or duration) of inbound voice calls 316, a total number (and/or duration) of outbound voice calls 318, and the like. Further, the record 300 may include a last suggested date 320 representing a most recent time the new telephone number was suggested to the user to be added to their contacts.

In some examples, the record 300 may record data representing all historical data, however such encompassing data-keeping may not be commercially practical. Accordingly, in some examples, the record 300 may record communications events for a predetermined period of time, on a roping basis, wherein data received prior to the predetermined period of time is deleted. For example, the record 300 may record communications events for the last 30 days, where data beyond 30 days old is deleted. It will be appreciated that other predetermined periods of time are also contemplated.

It will further be appreciated that the data fields of the record 300 as described above all exemplary only, and not all-inclusive; numerous other example data fields may be added in any particular implementation. For example, the record 300 can be zeroed or cleared once there has not been any event for a period of time such as one month. This should reduce inactive records.

Figure 4:
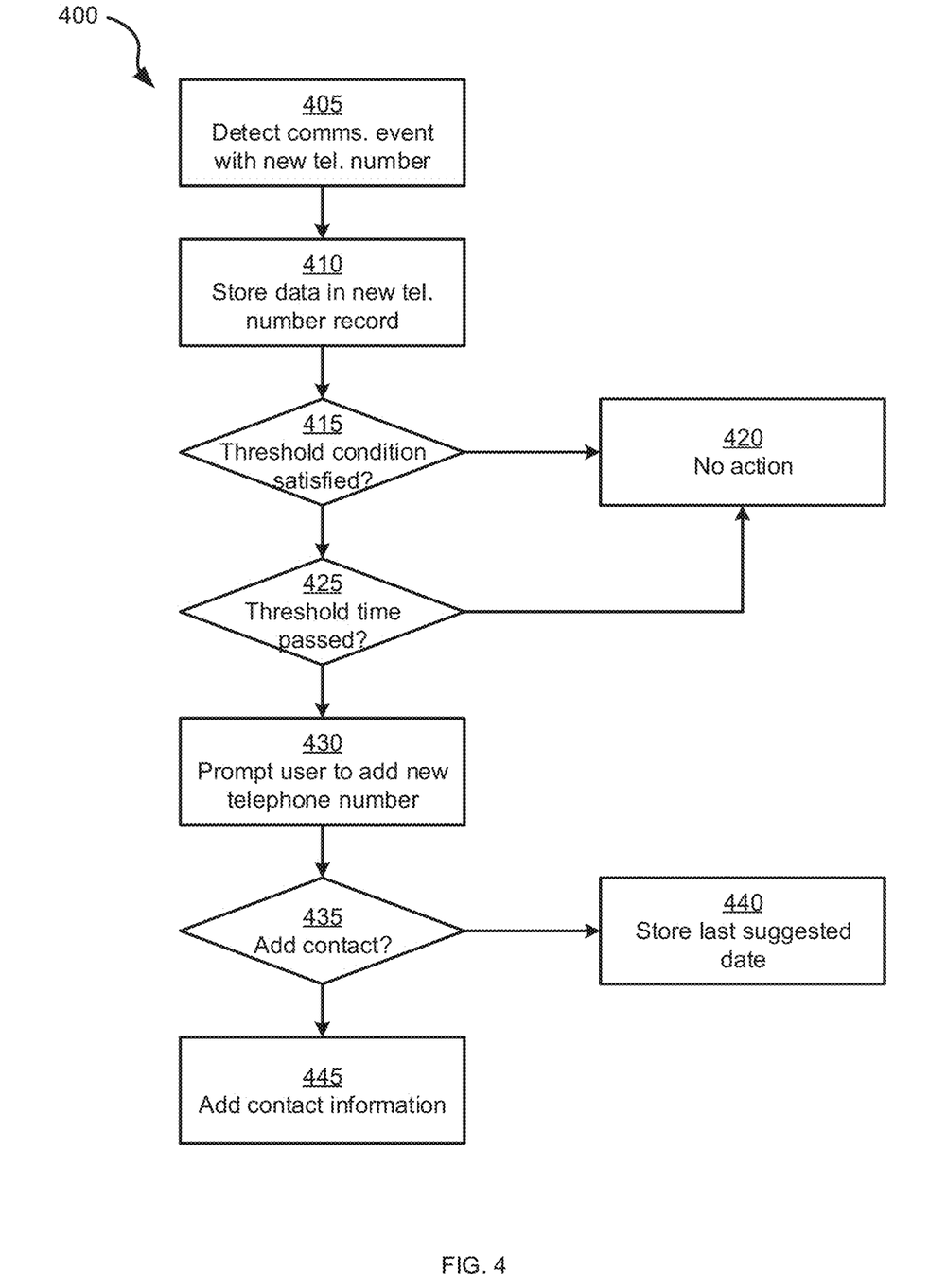
FIG. 4 is a flowchart of an example method of suggesting contacts in the communications system of FIG. 1.

Turning now to FIG. 4, a flowchart of an example method 400 for suggesting contacts is depicted. The method 400 will be described in conjunction with its performance in the system 100, and in particular, from the perspective of the communications routing system 42; in other examples, the method 400 may be performed by other suitable systems or devices. Further, in some examples, not all steps need be performed by the communications routing system 42. In some embodiments, the method 400 may be implemented in part or in full by one or more of the communications devices 30, 32. In still further embodiments, the method 400 may be implemented by another component illustrated in FIG. 1. However, it may be advantageous to implement the method 400 in the communications routing system 42, as described below, as the communications routing system 42 is intended to be operational at all times, and may allow for synchronization between the communications devices 30, 32 which are operational and connected to the communications routing system 42 in real time.

The method 400 will further be described in relation to a single user account. It will be appreciated that the method 400 may be repeated and performed for each user account tracked in the user databases 76.

The method 400 is initiated at block 405, where the communications routing system 42 detects a communications event between the telephone number of the user account in question and an endpoint telephone number. For example, the communications event may be an inbound text message, an outbound text message, an inbound voice call, or an outbound voice call. More particularly, at block 405, the communications routing system 42 detects that the endpoint telephone number is a new telephone number—i.e., a telephone number that is not stored in the contact information of the user account. For example, the communications routing system 42 may identify the endpoint telephone number as a new telephone number by comparing the endpoint telephone number with the telephone numbers in the contacts database 86.

It will be appreciated that for some inbound communications events, the communications routing system 42 may not be able to detect the endpoint telephone number due to caller ID blocking or other similar technology. In such cases, the present method 400 may not be applied.

At block 410, the communications routing system 42 stores data pertaining to the communications event detected at block 405 in the record 300 for the new telephone number. For example, if the new telephone number does not yet have a corresponding record 300, the communications routing system 42 may create a new record 300 for the new telephone number to be stored in the contacts database 86. In other examples, the communications routing system 42 may add a new line to an existing record 300 for the new telephone number. Further, the communications routing system 42 may update the aggregate data stored in the record 300.

At block 415, the communications routing system 42 determines whether the record 300 for the new telephone number satisfies a threshold condition.

For example, the threshold condition may be whether the number of communications events with the new telephone number exceeds a threshold frequency. For example, the number of communications events may be selected based on any one type of communications events (e.g., inbound text messages, outbound text messages, inbound voice calls, or outbound voice calls alone), or any combination of communications events (e.g., any text message event, any inbound event, all communications events, etc.). The threshold frequency may be set based on the type of communications event; in some examples, multiple threshold frequencies corresponding to different types or combinations of communications events may be stored. For example, the threshold frequency may be 2, 3, 4, 5 or 8 communications events per 30-day time period. In other examples, other time periods may be used.

Another example threshold condition may be whether the communications events satisfy a predefined distribution of communications events. The predefined distribution of events may be defined based on any one of or any combination of communications events. For example, the predefined distribution may include at least one outbound voice call and at least one outbound text message to the new telephone number. In other examples, the predefined distribution may include at least two of any type of outbound communications event (e.g., text message or voice call) to the new telephone number. Still further predefined distributions may include at least one outbound voice call, at least one text event, and at least one voice call event with the new telephone number. In other examples, the predefined distribution may be defined in relative terms. For example, the predefined distribution may be a percentage of at least 40% of all voice calls with the telephone numbers are outbound voice calls to the new telephone number.

Other example threshold conditions may be based on other attributes of one of the communications events stored in the record 300 satisfying a corresponding attribute condition. For example, the threshold condition may be whether at least one voice call exceeds a threshold duration (i.e., whether the duration of an inbound or outbound voice call exceeds the threshold duration). Other attributes may include a length of a text message event, or the like. As will be appreciated, other suitable threshold conditions may also be applied. Further, any of the above threshold conditions may be applied in the alternative or in any combination. For example, if any one of the threshold conditions is met, the determination at block 415 may be affirmative.

If the determination at block 415 is negative, the method 400 proceeds to block 420. At block 420, the communications routing system 42 takes no action, and the method 400 ends.

If the determination at block 415 is affirmative, the method 400 proceeds to block 425. At block 425, the communications routing system 42 checks the last suggested date 320 and determines whether a threshold amount of time has passed since the last suggested date 320. Specifically, the communications routing system 42 may check whether the last suggested date is within a predetermined minimum suggestion cool down period. The minimum suggestion cool down period represents the threshold amount of time (e.g., 30 days) that the communications routing system 42 is to wait after a negative response to suggest that the user add the new telephone number to the contact information in the contacts database 86. That is, the communications routing system 42 will only suggest adding the telephone number to the contact information at most once within the minimum suggestion cool down period. If the last suggested date 320 is blank, the determination at block 425 is affirmative.

If, at block 425, the last suggested date 320 is within the predetermined minimum suggestion cool down period, the method 400 proceeds to block 420 and the method 400 ends.

If, at block 425, the last suggested date 320 is outside the predetermined minimum suggestion cool down period, then the method 400 proceeds to block 430. At block 430, the communications routing system 42 provides a prompt, at the communications device associated with the user account, to add the new telephone number to the contacts database 86. Specifically, the prompt may suggest adding the new telephone number to the contact tracking application of the communications device. In some examples, where the user account is associated with multiple communications device, the communications routing system 42 may first select a communications device at which to provide the prompt. For example, the selected communications device may be based on the communications device used for the most recent communications event with the new telephone number (i.e., the communications event initiating the method 400). In other examples (e.g., for an unanswered incoming voice call), a communications device may not have been used for the communications event, hence an indication of the suggested contact may be stored in the user data database 76 and the communications routing system 42 may provide the prompt at the next active communications device associated with the account.

Figure 5:
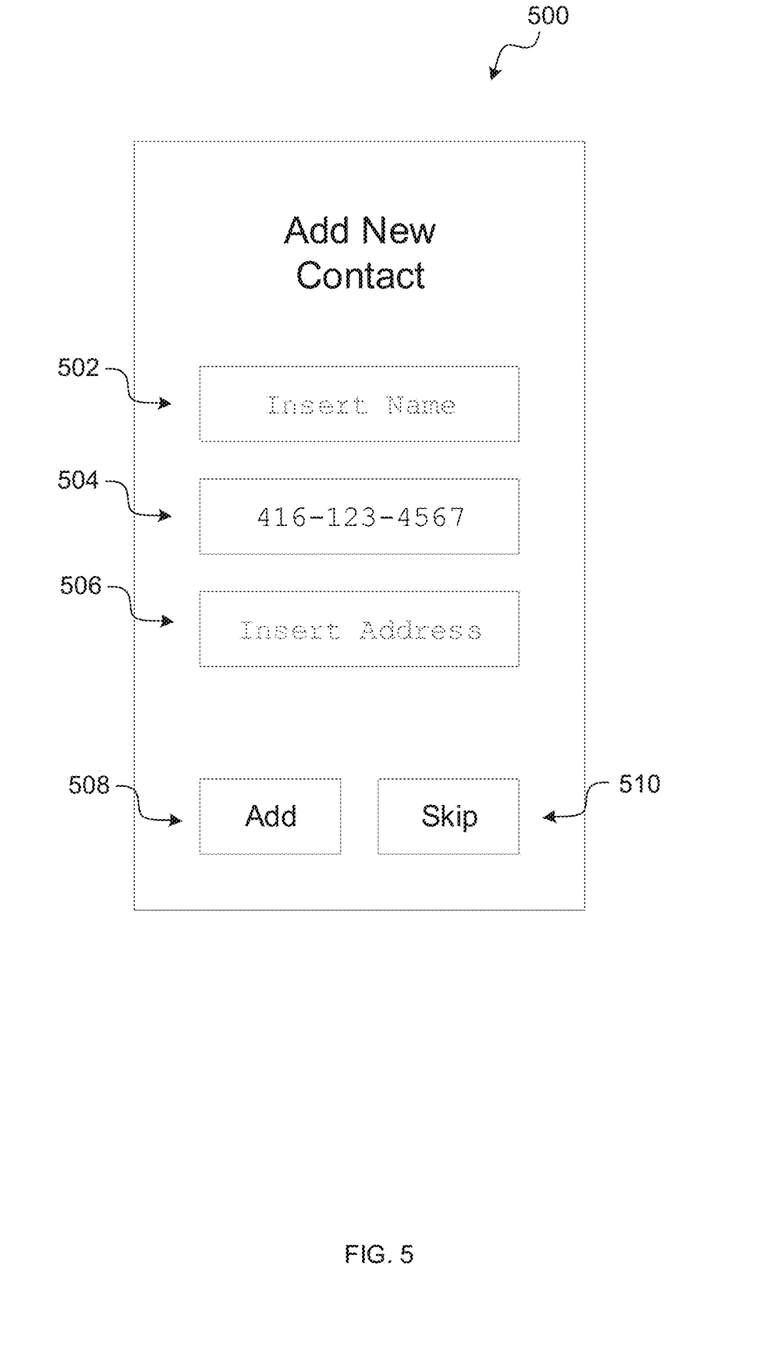
FIG. 5 is an example prompt for suggesting a contact in the communications system of FIG. 1.

For example, referring to FIG. 5, an example prompt 500 to add contact information for the new telephone number is depicted. Specifically, the prompt 500 may be displayed on a display screen or other user interface of the communications device. For example, the prompt 500 may be displayed following completion of a voice call with the new telephone number. The prompt 500 may include a name field 502 to receive a name associated with the new telephone number. In some examples, the communications routing system 42 may prepopulate the name field 502 with a name extracted from a caller ID service, if available, or from an Internet search of the new telephone number. If the name is not discernable, the name field 502 may be blank. In any case, the name field 502 may be editable to allow the user to change the name based on personal preferences. The prompt 500 further includes a telephone number field 504 with the new telephone number inserted. Optionally, the prompt 500 may include other editable data fields, such as an address field 506, or other data the user may wish to store for the contact (e.g., a birthday, a category, or the like). The prompt 500 further includes an add command 508 and a skip command 510. The add command 508 and the skip command 510 may be selectable buttons (e.g., as displayed on a touch screen display) or they may indicate instructions for receiving input from the user (e.g., press 1 to add, press 2 to skip, etc.) in cases where the commands 508 and 510 are not displayed on a touch screen. Input associated with the commands 508 and 510 are sent as responses to the communications routing system 42.

In other examples, the prompt 500 may include only the telephone number field 504 the add command 508, and the skip command 510. The add command 508 may subsequently initiate a new contact procedure, in which the contact data fields (e.g., the name field 502, the address field 506, and other suitable information fields) may be input by the user. For example, selecting the add command 508 may trigger a new contact in the contact tracking application.

White this implementation provides for a minimum suggestion cod down period, an alternate implementation can be blocking suggesting adding the new telephone number to the contact information if the user has rejected adding the new telephone number before or previously. Such blocking can be accomplished by having the skip command 510 be a command to permanently not suggest adding the new telephone number again.

Returning to FIG. 4, at block 435, the communications routing system 42 receives the response from the communications device indicating whether to add the new telephone number.

If the response at block 435 is negative, the method 400 proceeds to block 440, in which the communications routing system 42 stores the current date or date time as the last suggested date 320 in association with the new telephone number.

If the response at block 435 is affirmative, the method 400 proceeds to block 445. At block 445, the new telephone number, and any associated contact information (e.g., as obtained from the data fields in the prompt 500, or as obtained from a subsequent new contact procedure) is stored in the contact tracking application at the communications device.

Figure 6A:
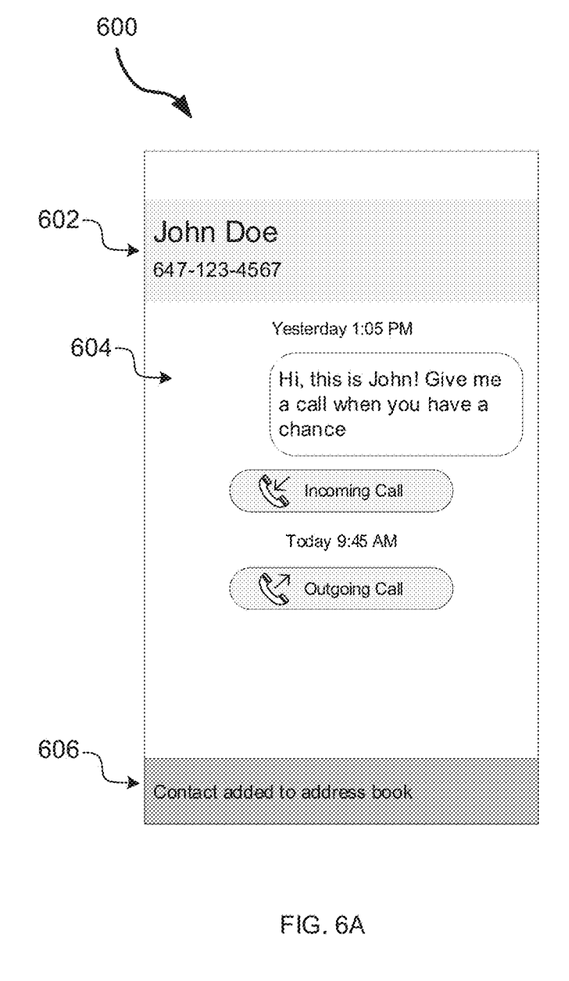
FIGS. 6A and 6B are example pages after adding contacts in the communications system of FIG. 1.

In some examples, after storing the new telephone number, the communications device may display a history of communications events with the new telephone number. For example, responsive to storing the new telephone number the communications routing system 42 may send the record of communications events with the new telephone number to the communications device for displaying at the communications device. For example, referring to FIG. 6A, an example history page 600 is displayed. The page 600 generally displays a historical queue of communications events with the new telephone number. Specifically, the page 600 may include information fields 602 including the new telephone number and the associated contact information as stored in the contact tracking application, as well as indications 604 of previous communications events. In some examples, the page 600 may also include a notification 606 indicating the addition of the new telephone number to the contact tracking application. The notification 606 may be displayed for a predetermined period of time (e.g. 2 minutes, or other suitable periods of time).

Figure 6B:
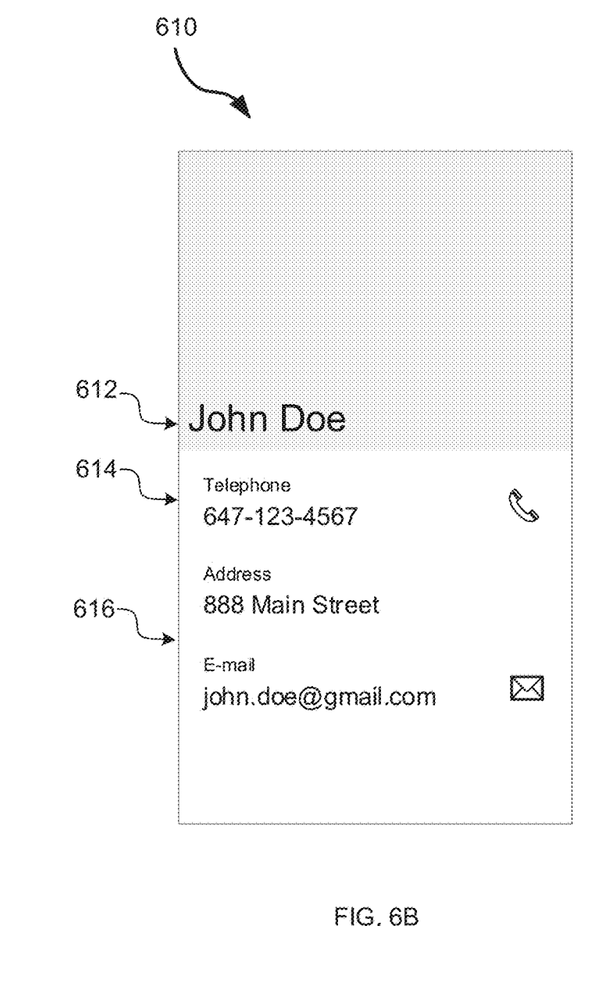

In other examples, after storing the new telephone number, the communications device may display a contact information page 610, as depicted in FIG. 6B. The page 610 generally includes contact information stored in the contact tracking application, and may be a graphical user interface of the contact tracking application. Specifically, the page 610 includes a name field 612, a telephone number field 614, and additional contact information fields 616 (e.g., including an address, additional/alternate telephone numbers, or other fields).

Returning to FIG. 4, at block 445, the new telephone number and associated contact information may also be stored in the contact database 86 at the communications routing system 42. Specifically, the communications routing system 42 obtains contact information associated with the new telephone number (e.g., as obtained from the data fields in the prompt 500) and stores the new telephone number and associated contact information in the contact database. In some examples, obtention and storage of the new telephone number and associated contact information at the communications routing system 42 may be performed in response to a synchronization event with the contact tracking application at the communications device. Further, at block 445, responsive to an affirmative response at block 435, the communications routing system 42 deletes the record 300 associated with the new telephone number in the log of communications events.

The scope of the claims should not be limited by the embodiments set forth in the above examples, but should be given the broadest interpretation consistent with the description as a whole.

The invention claimed is:

1. A communications routing system comprising:
a contacts database to store for a user account:
telephone numbers associated with contacts of the user account; and
a record of past communications events relating to a new telephone number not stored in the contacts database;
a routing engine to:
detect a communications event between the user account and the new telephone number;
add the communications event to the record; and
when the record satisfies a threshold condition, provide a prompt to a communications device associated with the user account to add the telephone number to the contacts database.

2. The communications routing system of claim 1, wherein the threshold condition comprises one or more of:
a number of communications events with the new telephone number in the record exceeding a threshold number;
a frequency of communications events with the new telephone number in the record exceeding a threshold frequency;
the communications events with the new telephone number in the record satisfying a predefined distribution of communication events; and
an attribute of one of the communications events satisfying a corresponding attribute condition.

3. The communications routing system of claim 1, wherein the routing engine is configured to:
determine whether a voice call exceeds a predetermined duration; and
add the voice call as a communications event to the record only when the voice call exceeds the predetermined duration.

4. The communications routing system of claim 1, wherein the contacts database is configured to store the record for a predetermined period of time on a rolling basis, wherein data received prior to the predetermined period of time is deleted.

5. The communications routing system of claim 1, wherein the record comprises data fields for individual communications event with the new telephone number and data fields to store aggregate data for each type of communications event.

6. The communications routing system of claim 1, wherein the contacts database is further to store a last suggested date for the new telephone number; and wherein the routing engine is to provide the prompt only when the last suggested date is outside a predetermined minimum suggestion cool down period.

7. The communications routing system of claim 1, wherein, in response to a negative response to the prompt, the contacts database is to store a current date as a last suggested date in association with the telephone number.

8. The communications routing system of claim 1, wherein, in response to an affirmative response to the prompt, the contacts database is to add the new telephone number and contact information associated with the new telephone number as a contact.

9. The communications routing system of claim 1, wherein, in response to a negative response to the prompt, if a last suggested date has a value, the routing engine is to block the new telephone number from being suggested.

10. A non-transitory machine-readable storage medium storing instructions to:
store, in a contacts database for a user account:
telephone numbers associated with contacts of the user account; and
a record of past communications events relating to a new telephone number not stored in the contacts database;
detect a communications event between the user account and the new telephone number;
add the communications event to the record; and
when the record satisfies a threshold condition, provide a prompt to a communications device associated with the user account to add the telephone number to the contacts database.

11. The non-transitory machine-readable storage medium of claim 10, wherein the threshold condition comprises one or more of:
a number of communications events with the new telephone number in the record exceeding a threshold number;
a frequency of communications events with the new telephone number in the record exceeding a threshold frequency;
the communications events with the new telephone number in the record satisfying a predefined distribution of communication events; and
an attribute of one of the communications events satisfying a corresponding attribute condition.

12. The non-transitory machine-readable storage medium of claim 10, wherein the instructions are further to:
determine whether a voice call exceeds a predetermined duration; and
add the voice call as a communications event to the record only when the voice call exceeds the predetermined duration.

13. The non-transitory machine-readable storage medium of claim 10, wherein the contacts database is configured to store the record for a predetermined period of time on a rolling basis, wherein data received prior to the predetermined period of time is deleted.

14. The non-transitory machine-readable storage medium of claim 10, wherein the record comprises data fields for individual communications event with the new telephone number and data fields to store aggregate data for each type of communications event.

15. The non-transitory machine-readable storage medium of claim 10, wherein the contacts database is further to store a last suggested date for the new telephone number; and wherein the routing engine is to provide the prompt only when the last suggested date is outside a predetermined minimum suggestion cool down period.

16. The non-transitory machine-readable storage medium of claim 10, wherein, in response to a negative response to the prompt, the contacts database is to store a current date as a last suggested date in association with the telephone number.

17. The non-transitory machine-readable storage medium of claim 10, wherein, in response to an affirmative response to the prompt, the contacts database is to add the new telephone number and contact information associated with the new telephone number as a contact.

18. The non-transitory machine-readable storage medium of claim 10, wherein, in response to a negative response to the prompt, if a last suggested date has a value, the routing engine is to block the new telephone number from being suggested.

* * * * *